(12) United States Patent
Rao et al.

(10) Patent No.: US 11,341,958 B2
(45) Date of Patent: *May 24, 2022

(54) TRAINING ACOUSTIC MODELS USING CONNECTIONIST TEMPORAL CLASSIFICATION

(71) Applicant: Google LLC, Mountain View, CA (US)

(72) Inventors: Kanury Kanishka Rao, Santa Clara, CA (US); Andrew W. Senior, New York, NY (US); Hasim Sak, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 72 days.

This patent is subject to a terminal disclaimer.

(21) Appl. No.: 17/022,224

(22) Filed: Sep. 16, 2020

(65) Prior Publication Data

US 2021/0005184 A1 Jan. 7, 2021

Related U.S. Application Data

(63) Continuation of application No. 16/258,309, filed on Jan. 25, 2019, now Pat. No. 10,803,855, which is a
(Continued)

(51) Int. Cl.
  *G10L 15/16* (2006.01)
  *G10L 15/187* (2013.01)
(Continued)

(52) U.S. Cl.
  CPC ............ *G10L 15/16* (2013.01); *G10L 15/187* (2013.01); *G10L 15/30* (2013.01); *G10L 2015/022* (2013.01)

(58) Field of Classification Search
  CPC ....... G10L 15/16; G10L 15/187; G10L 15/30; G10L 2015/022; G10L 704/202
  See application file for complete search history.

(56) References Cited

U.S. PATENT DOCUMENTS

| | | |
|---|---|---|
| 4,799,262 A | 1/1989 | Feldman et al. |
| 4,868,867 A | 9/1989 | Davidson et al. |

(Continued)

FOREIGN PATENT DOCUMENTS

| | | |
|---|---|---|
| EP | 0715298 B1 | 9/2000 |
| EP | 2431969 B1 | 4/2013 |

(Continued)

OTHER PUBLICATIONS

T. Robinson, "Several Improvements to a Recurrent Error Propagation Phone Recognition System", Technical Report CUED/TINFENG/TR. 82, 1991. (Year: 1991).*

(Continued)

*Primary Examiner* — Fariba Sirjani
(74) *Attorney, Agent, or Firm* — Honigman LLP; Brett A. Krueger; Grant Griffith

(57) ABSTRACT

Methods, systems, and apparatus, including computer programs encoded on a computer storage medium, for training acoustic models and using the trained acoustic models. A connectionist temporal classification (CTC) acoustic model is accessed, the CTC acoustic model having been trained using a context-dependent state inventory generated from approximate phonetic alignments determined by another CTC acoustic model trained without fixed alignment targets. Audio data for a portion of an utterance is received. Input data corresponding to the received audio data is provided to the accessed CTC acoustic model. Data indicating a transcription for the utterance is generated based on output that the accessed CTC acoustic model produced in response to the input data. The data indicating the transcription is provided as output of an automated speech recognition service.

18 Claims, 6 Drawing Sheets

Related U.S. Application Data continuation of application No. 15/397,327, filed on Jan. 3, 2017, now Pat. No. 10,229,672.

(60) Provisional application No. 62/273,618, filed on Dec. 31, 2015.

(51) Int. Cl.
*G10L 15/30* (2013.01)
*G10L 15/02* (2006.01)

(56) References Cited

U.S. PATENT DOCUMENTS

| | | | |
|---|---|---|---|
| 5,150,449 A | 9/1992 | Yoshida et al. | |
| 5,317,673 A | 5/1994 | Cohen et al. | |
| 5,444,488 A | 8/1995 | Goubault et al. | |
| 5,455,889 A | 10/1995 | Bahl et al. | |
| 5,465,318 A | 11/1995 | Sejnoha | |
| 5,481,644 A | 1/1996 | Inazumi | |
| 5,509,103 A | 4/1996 | Wang | |
| 5,542,006 A | 7/1996 | Shustorovich et al. | |
| 5,544,249 A * | 8/1996 | Opitz | H04S 7/305 |
| | | | 381/61 |
| 5,600,753 A | 2/1997 | Iso | |
| 5,625,749 A * | 4/1997 | Goldenthal | G10L 15/02 |
| | | | 704/254 |
| 5,627,939 A | 5/1997 | Huang et al. | |
| 5,729,656 A | 3/1998 | Nahamoo et al. | |
| 5,737,485 A * | 4/1998 | Flanagan | G10L 15/16 |
| | | | 704/232 |
| 5,745,872 A | 4/1998 | Sonmez et al. | |
| 5,749,066 A | 5/1998 | Nussbaum | |
| 5,754,978 A * | 5/1998 | Perez-Mendez | G10L 15/32 |
| | | | 704/239 |
| 5,809,462 A | 9/1998 | Nussbaum | |
| 5,864,803 A | 1/1999 | Nussbaum | |
| 5,867,816 A | 2/1999 | Nussbaum | |
| 5,937,384 A | 8/1999 | Huang et al. | |
| 5,960,399 A | 9/1999 | Barclay et al. | |
| 5,963,903 A | 10/1999 | Hon et al. | |
| 6,038,528 A | 3/2000 | Mammone et al. | |
| 6,067,517 A | 5/2000 | Bahl et al. | |
| 6,188,982 B1 | 2/2001 | Chiang | |
| 6,260,013 B1 | 7/2001 | Sejnoha | |
| 6,381,569 B1 | 4/2002 | Sih et al. | |
| 6,397,179 B2 | 5/2002 | Crespo et al. | |
| 6,434,520 B1 | 8/2002 | Kanevsky et al. | |
| 6,577,999 B1 | 6/2003 | Lewis et al. | |
| 6,631,348 B1 | 10/2003 | Wymore | |
| 6,668,243 B1 | 12/2003 | Odell | |
| 6,799,171 B1 | 9/2004 | Van Kommer | |
| 6,876,966 B1 | 4/2005 | Deng et al. | |
| 7,043,427 B1 * | 5/2006 | Kern | G10K 15/08 |
| | | | 381/94.7 |
| 7,062,442 B2 | 6/2006 | Berg et al. | |
| 7,065,487 B2 | 6/2006 | Miyazawa | |
| 7,337,146 B2 | 2/2008 | Heelan et al. | |
| 7,424,426 B2 | 9/2008 | Furui et al. | |
| 7,756,708 B2 | 7/2010 | Cohen et al. | |
| 7,826,945 B2 | 11/2010 | Zhang et al. | |
| 7,844,466 B2 | 11/2010 | Roy | |
| 8,126,710 B2 | 2/2012 | Gemello et al. | |
| 8,239,195 B2 | 8/2012 | Li et al. | |
| 8,340,308 B2 | 12/2012 | Chen et al. | |
| 8,442,125 B2 | 5/2013 | Covell et al. | |
| 8,463,719 B2 | 6/2013 | Lyon et al. | |
| 8,615,397 B2 | 12/2013 | Hart | |
| 8,751,230 B2 | 6/2014 | Saffer | |
| 8,782,012 B2 | 7/2014 | Fusco et al. | |
| 8,849,185 B2 | 9/2014 | Cheung et al. | |
| 8,965,112 B1 | 2/2015 | Ibarz et al. | |
| 8,972,253 B2 * | 3/2015 | Deng | G10L 15/14 |
| | | | 704/231 |
| 9,123,338 B1 | 9/2015 | Sanders et al. | |
| 9,263,036 B1 | 2/2016 | Graves | |
| 9,299,347 B1 | 3/2016 | Siohan et al. | |
| 9,620,145 B2 * | 4/2017 | Bacchiani | G10L 15/26 |
| 9,697,822 B1 | 7/2017 | Naik et al. | |
| 9,728,185 B2 * | 8/2017 | Schalkwyk | G10L 15/187 |
| 9,786,270 B2 * | 10/2017 | Senior | G10L 15/063 |
| 9,836,671 B2 | 12/2017 | Gao et al. | |
| 9,865,299 B2 | 1/2018 | Ueda et al. | |
| 9,881,615 B2 | 1/2018 | Choi et al. | |
| 9,886,957 B2 | 2/2018 | Seo et al. | |
| 10,229,672 B1 * | 3/2019 | Rao | G10L 15/16 |
| 10,528,866 B1 * | 1/2020 | Dai | G06N 3/0445 |
| 10,607,602 B2 * | 3/2020 | Kanda | G10L 15/16 |
| 10,733,979 B2 * | 8/2020 | Senior | G06N 3/0454 |
| 10,803,855 B1 * | 10/2020 | Rao | G10L 15/16 |
| 11,062,615 B1 * | 7/2021 | Speciner | G09B 5/06 |
| 2001/0001141 A1 | 5/2001 | Sih et al. | |
| 2002/0077828 A1 | 6/2002 | Robbins | |
| 2002/0165715 A1 | 11/2002 | Riis et al. | |
| 2003/0033143 A1 | 2/2003 | Aronowitz | |
| 2003/0088411 A1 | 5/2003 | Ma et al. | |
| 2003/0110035 A1 | 6/2003 | Thong et al. | |
| 2003/0204394 A1 | 10/2003 | Garudadri et al. | |
| 2004/0138882 A1 | 7/2004 | Miyazawa | |
| 2004/0162722 A1 | 8/2004 | Rex et al. | |
| 2004/0162730 A1 | 8/2004 | Mahajan et al. | |
| 2004/0181408 A1 | 9/2004 | Acero et al. | |
| 2004/0230424 A1 | 11/2004 | Gunawardana | |
| 2004/0260546 A1 | 12/2004 | Seo et al. | |
| 2006/0053008 A1 | 3/2006 | Droppo et al. | |
| 2006/0149558 A1 | 7/2006 | Kahn et al. | |
| 2006/0184362 A1 | 8/2006 | Preuss et al. | |
| 2006/0195317 A1 | 8/2006 | Graciarena et al. | |
| 2007/0005206 A1 | 1/2007 | Zhang et al. | |
| 2007/0088547 A1 | 4/2007 | Freedman | |
| 2007/0088552 A1 | 4/2007 | Olsen | |
| 2007/0118373 A1 | 5/2007 | Wise et al. | |
| 2008/0300875 A1 | 12/2008 | Yao et al. | |
| 2009/0238370 A1 * | 9/2009 | Rumsey | H04R 29/00 |
| | | | 381/58 |
| 2009/0254343 A1 | 10/2009 | Hart | |
| 2010/0318354 A1 | 12/2010 | Seltzer et al. | |
| 2011/0103614 A1 | 5/2011 | Cheung et al. | |
| 2011/0173208 A1 | 7/2011 | Vogel | |
| 2011/0307253 A1 | 12/2011 | Lloyd et al. | |
| 2012/0004909 A1 | 1/2012 | Beltman et al. | |
| 2012/0065976 A1 | 3/2012 | Deng et al. | |
| 2012/0143604 A1 | 6/2012 | Singh | |
| 2013/0138436 A1 | 5/2013 | Yu et al. | |
| 2013/0223645 A1 | 8/2013 | Hetherington et al. | |
| 2013/0225128 A1 | 8/2013 | Gomar | |
| 2013/0238324 A1 | 9/2013 | Ichikawa | |
| 2013/0297299 A1 | 11/2013 | Chakrabartty et al. | |
| 2013/0325473 A1 | 12/2013 | Larcher et al. | |
| 2013/0343641 A1 | 12/2013 | Mnih et al. | |
| 2014/0142929 A1 | 5/2014 | Seide et al. | |
| 2014/0156575 A1 | 6/2014 | Sainath et al. | |
| 2014/0188487 A1 | 7/2014 | Perez Gonzalez et al. | |
| 2014/0257804 A1 | 9/2014 | Li et al. | |
| 2014/0258286 A1 | 9/2014 | Brown et al. | |
| 2014/0372112 A1 | 12/2014 | Xue et al. | |
| 2015/0066499 A1 | 3/2015 | Wang et al. | |
| 2015/0100530 A1 | 4/2015 | Mnih et al. | |
| 2015/0127327 A1 | 5/2015 | Bacchiani et al. | |
| 2015/0127342 A1 | 5/2015 | Sharif et al. | |
| 2015/0127594 A1 | 5/2015 | Parada San Martin et al. | |
| 2015/0340034 A1 | 11/2015 | Schalkwyk et al. | |
| 2015/0371633 A1 | 12/2015 | Chelba | |
| 2016/0093294 A1 | 3/2016 | Kapralova et al. | |
| 2016/0111107 A1 * | 4/2016 | Erdogan | G10L 25/03 |
| | | | 704/226 |
| 2016/0171974 A1 | 6/2016 | Hannun et al. | |
| 2016/0171977 A1 | 6/2016 | Siohan et al. | |
| 2016/0307566 A1 | 10/2016 | Bellegarda | |
| 2016/0378195 A1 | 12/2016 | Lefebvre | |
| 2017/0004824 A1 | 1/2017 | Yoo et al. | |
| 2017/0011738 A1 | 1/2017 | Senior et al. | |
| 2017/0025117 A1 | 1/2017 | Hong | |
| 2017/0053646 A1 | 2/2017 | Watanabe et al. | |

(56) References Cited

U.S. PATENT DOCUMENTS

| | | | |
|---|---|---|---|
| 2017/0053652 | A1 | 2/2017 | Choi et al. |
| 2017/0124435 | A1 | 5/2017 | Wustlich |
| 2017/0125020 | A1 | 5/2017 | Seo et al. |
| 2017/0148433 | A1 | 5/2017 | Catanzaro et al. |
| 2017/0193988 | A1 | 7/2017 | Cheluvaraja et al. |
| 2018/0204566 | A1* | 7/2018 | Kanda .................. G10L 15/193 |
| 2018/0254034 | A1* | 9/2018 | Li ........................ G10L 15/183 |

FOREIGN PATENT DOCUMENTS

| | | |
|---|---|---|
| EP | 2507790 B1 | 1/2014 |
| EP | 2905780 A1 | 8/2015 |
| WO | 2002/093934 A1 | 11/2002 |

OTHER PUBLICATIONS

"Recurrent neural network," From Wikipedia, the free encyclopedia, last modified on Sep. 30, 2015 [retrieved on Oct. 8, 2015]. Retrieved from the Internet: URL <https://en.wikipedia.org/wiki/Recuirent_neural_network>, 9 pages.

"Speech recognition," From Wikipedia, the free encyclopedia, last modified on Oct. 1, 2015 [retrieved on Oct. 8, 2015]. Retrieved from the Internet: URL <https://en.wikipedia.org/wiki/Speech_recognition>, 16 pages.

"Time delay neural network," From Wikipedia, the free encyclopedia, last modified on Mar. 23, 2015 [retrieved on Oct. 8, 2015]. Retrieved from the Internet: URL <https://en.wikipedia.org/wiki/Time_delay_neural_network>, 1 page.

Aronowitz et al., "New developments in voice biometrics for user Authentication," in Interspeech, Aug. 2011, pp. 17-20.

Aronowitz, "Text-dependent speaker verification using a small development set," in Proc. Odyssey Speaker and Language Recognition Workshop, 2012, 28 pages.

Auckenthaler et al., "Score normalization for text-independent speaker verification systems," Digital Signal Processing, 10: 42-54, 2000.

Bahl et al., "Context Dependent Modeling of Phones in Continuous Speech Using Decision Trees," HLT '91 Proceedings of the workshop on Speech and Natural Language, pp. 264-269, 1991.

Bennani et al., "Connectionist approaches for automatic speaker recognition," in ESCA Workshop on Automatic Speaker Recognition, Identification and Verification, 1990, 265-268.

Bluche et al. "Framewise and CTC Training of Neural Networks for Handwriting Recognition," 13th international conference on documents analysis and recognition, Aug. 23, 2015, 5 pages.

Brants et al., "Large language models in machine translation," in EMNLP, Jun. 2007, pp. 858-867.

Breuel. "Benchmarking of LSTM networks," arXiv preprint arXiv 1508.02774v1, Aug. 11, 2015, 17 pages.

Chou, "Optimal partitioning for classification and regression trees," IEEE Trans. on Pattern Analysis and Machine Intelligence, vol. 13, No. 4, Apr. 1991, 15 pages.

Coates and Ng, "The importance of encoding versus training with sparse coding and vector quantization," in Proceedings of the 28th International Conference on Machine Learning (ICML-11), Jun. 2011, pp. 921-928.

Dahl et al "Context-Dependent Pre-Trained Deep Neural Networks for Large-Vocabulary Speech Recognition", IEEE, Trans., ASLP vol. 20 No. 1, Jan. 2012.

Dahl et al., "Improving deep neural networks for LVCSR using rectified linear units and dropout," in Proc. ICASSP, 2013, 5 pages.

Dean et al., "Large Scale Distributed Deep Networks," Proc. Neural Information Processing Systems, Dec. 2012, 9 pages.

Dehak et al., "Front-end factor analysis for speaker verification," IEEE Transactions on Audio, Speech, and Language Processing, 19: 788-798, 2011.

Deng et al. "Roles of pre-training and fine-tuning in context-dependent DBN-HMMs for real-world speech recognition," in NIPS, 2010, 8 pages.

Donahue et al. "Decaf: A deep convolutional activation feature for generic visual recognition." arXiv preprint arXiv: 1310.1531 (2013).

Eyben et al., "From Speech to Letters—Using a Novel Neural Network Architecture for Grapheme Based ASR," Automatic Speech Recognition & Understanding, 2009, ASRU 2009, IEEE Workshop on, pp. 376-380, 2009.

Fernandez et al., "Phoneme recognition in TIMIT with BLSTM-CTC," Technical Report No. IDSIA-04-08, Apr. 2008, 7 pages.

Finan et al., "Comparison of multilayer and radial basis function neural networks for text-dependent speaker recognition," Neural Networks, 1996, IEEE International Conference on. vol. 4. IEEE, 1996, pp. 1992-1997.

Fiscus, "A post-processing system to yield reduced word error rates: Recognizer output voting error reduction (ROVER)," in IEEE Automatic Speech Recognition and Understanding Workshop (ASRU), pp. 347-354, Dec. 1997.

Garimella et al., "Factor analysis of auto-associative neural networks with application in speaker verification," IEEE transactions on neural networks and learning systems 24(4):522-528. Apr. 2013.

Goffin et al., "The AT&T Watson Speech Recognizer," in Proceedings of ICASSP 2005, 4 pages.

Goodfellow et al. "Maxout networks," in Proc. JMLR, 2013, 1319-1327.

Graves et al. "Connectionist Temporal Classification: Labelling Unsegmented Sequence Data with Recurrent Neural Networks," Proceedings of the 23rd International Conference on Machine Learning, Jun. 25, 2006, 8 pages.

Graves et al. "Speech Recognition with Deep Recurrent Neural Networks," arXiv Preprint arXiv 1303.5778v1, Mar. 22, 2013, 5 pages.

Graves et al. "Supervised Sequence Labelling with Recurrent Neural Networks," Springer-Verlag Berlin Heidelberg, © 2012, 137 pages.

Graves et al., "A Novel Connectionist System for Unconstrained Handwriting Recognition," Pattern Analysis and Machine Intelligence, IEEE Transactions on, 31(5):855-868, May 2008.

Graves et al., "Framewise Phoneme Classification with Bidirectional LSTM and Other Neural Network Architectures," Neural Networks, 18(5):602-610, Aug. 2005.

Graves et al., "Towards End-to-End Speech Recognition with Recurrent Neural Networks," Proceedings of the 3151 International Conference on Machine Learning, vol. 32, pp. 1764-1772, 2014.

Grosz et al., "A Sequence Training Method for Deep Rectifier Neural Networks in Speech Recognition," Speech and Computer. Springer International Publishing, 2014, pp. 81-88.

Hartman, "Training feed-fonvard neural networks with gain constraints," Neural Computation, 12(4):811-829, Apr. 2000, Abstract only, 1 page.

Hassibi et al., "Second order derivatives for network pruning: Optimal brain surgeon," in Advances in Neural Information Processing Systems 5, 1993, DD. 164-171.

Hermansky et al., "Tandem connectionist feature extraction for conventional HMM systems," in IEEE International Conference on Acoustics, Speech, and Signal Processing (ICASSP), pp. 1635-1638, Jun. 2000.

Hinton et al "Deep Neural Networks for Acoustic Modeling in Speech Recognition" IEEE Signal Processing Magazine vol. 29, No. 6 2012.

Hinton et al., "Distilling the Knowledge in a Neural Network," arXiv preprint arXiv:1503.02531, Mar. 2015, 9 pages.

Hinton et al., "Improving neural networks by preventing co-adaptation of feature detectors," in arXive preprint, 2012, 1-18.

Hochreiter et al. "Long short-term memory," Neural Computation, 9(8): 1735-1780, Nov. 1997.

Huang et al., "Semi-supervised GMM and DNN acoustic model training with multi-system combination and confidence re-calibration," in Interspeech, Aug. 2013, pp. 2360-2364.

Jaitly et al., "Application of pretrained deep neural networks to large vocabulary speech recognition," in Interspeech, 2012, 4 pages.

Jarrett et al., "What is the best multi-stage architecture for object recognition?" in ICCV. IEEE, 2009, pp. 2146-2153.

Jiang, "Confidence measures for speech recognition: A survey," Speech Communication, vol. 45, No. 4, pp. 455-470, Apr. 2005.

(56) References Cited

OTHER PUBLICATIONS

Kenny et al., "A study of interspeaker variability in speaker verification," IEEE Transactions on Audio, Speech, and Language Processing, 16: 980-988, 2008.
Kenny et al., "Joint Factor Analysis versus Eigenchannels in Speaker Recognition," IEEE Transactions on Audio, Speech, and Language Processing, 15: 1435-1447, 2007.
Kenny et al., "Speaker and session variability in GMM-based speaker verification," IEEE Transactions on Audio, Speech, and Language Processing, 15: 1448-1460, 2007.
Kinnunen et al., "Real-time speaker identification and verification," IEEE Transactions on Audio, Speech and Language Processing, Jan. 1, 2006, 14(1):277-288.
Kuo et al. "Active learning with minimum expected error for spoken language understanding," in Interspeech, Sep. 2005, pp. 437-440.
Lamel et al., "Lightly supervised and unsupervised acoustic model training," Computer Speech and Language, vol. 16, No. 1, pp. 115-229, Jan. 2002.
Larcher et al. "Phonetically-constrained PLDA modeling for text-dependent speaker verification with multiple short utterances," in Proc. ICASSP, May 26-31, 2013, 7673-7677.
LeCun et al., "Gradient-based learning applied to document recognition," Proceedings of the IEEE, vol. 86, No. 11, pp. 2278-2324, Nov. 1998.
LeCun et al., "Learning methods for generic object recognition with invariance to pose and lighting," in Computer Vision and Pattern Recognition, 2004. CVPR 2004. Proceedings of the 2004 IEEE Computer Society Conference on, vol. 2. IEEE, Jul. 2004, DD. 11-97-104.
Lee et al., "Unsupervised feature learning for audio classification using convolutional deep belief networks," in NIPS, 2009, pp. 1096-1104.
Lei et al., "Application of convolutional neural networks to language identification in noisy conditions," in Proc. Speaker Odyssey Workshop (submitted), 2014, 6 pages.
Liao et al., "Large scale deep neural network acoustic modeling with semi-supervised training data for youtube video transcription," in Workshop on Automatic Speech Recognition and Understanding (ASRU), 2013, 6 pages.
Liao et al., "Large vocabulary automatic speech recognition for children," Interspeech 2015, pp. 1611-1615, Sep. 2015.
Ma et al. "Unsupervised versus supervised training of acoustic models," in Inter Speech, Sep. 2008, pp. 2374-2377.
MathWorks Support Team, "Is it possible to impose constraints on a neural network using Neural Network Toolbox?" MATLAB Answers™ Jun. 27, 2009 [retrieved on Oct. 8, 2015]. Retrieved from the Internet: URL<http://www.mathworks.com/matlabcentral/answers/99132/-is-it-possible-to-impose-constraints-on-a-neural-network-using-neural-network-toolbox>, 3 pages.
McLaren et al., "Application of convolutional neural networks to speaker recognition in noisy conditions," in 15th Annual Conference of the International Speech Communication Association, h Sep. 2014, pp. 686-690.
Mohamed et al., "Deep Belief Networks for phone recognition," ICASSP, 2011, pp. 1-9.
Mohri et al., "Weighted Finite-State Transducers in Speech Recognition," Computer Speech and Language, vol. 16, issue 1, Jan. 2002, 26 pages.
Morgan et al., "Continuous speech recognition: An introduction to the hybrid HMM/connectionist approach," IEEE Signal Processing Magazine, vol. 12, No. 3, pp. 25-42, 1995.
Nair et al., "Rectified linear units improve restricted Boltzmann machines," in ICML, 2010, 8 pages.
Oglesby et al., "Optimisation of neural models for speaker identification," in Proc. ICASSP, Apr. 3-6, 1990, 1:261-264.
Schwarz et al. "Hierarchical Structures of Neural Networks for Phoneme Recognition," 2006 IEEE International Conference on Acoustics Speech and Signal Processing Proceedings, Toulouse, 2006, pp. 1-1.

Pennlio, "Fully-connected, locally-connected and shared weights layer in neural networks," Peng's Blog, Apr. 11, 2014 [retrieved on Sep. 8, 2015]. Retrieved from the Internet: URL<http://pennlio.wordpress.com/?s=fully-connected%2C+locally-connected>, 4 pages.
Prabhavalkar et al., "Automatic gain control and multi-style training for robust small-footprint keyword spotting with deep neural networks," Acoustics, Speech and Signal Processing (ICASSP), 2015 IEEE International Conference on, Apr. 2015, pp. 4704-4708.
Ramaswamy, Ganesh N. et al., "Compression of Acoustic Features for Speech Recognition in Network Environments," ICASSP 1998, 4 pages.
Rao et al., "Grapheme-to-Phoneme Conversion Using Long Short-Term Memory Recurrent Neural Networks," Proceedings ofICASSP, 2015, 5 pages.
Reynolds et al., "Speaker Verification Using Adapted Gaussian Mixture Models," Digital Signal Processing 10, 19-41 (2000).
Robinson et al., "A recurrent error propagation network speech recognition system," Computer Speech and Language, 5(3):259-274, Jul. 1991.
Rumelhart et al "Learning representations by back-propagating errors" Nature vol. 323, Oct. 9, 1986.
Rybach et al., "Direct construction of compact context-dependency transducers from data," Computer Speech and Language, vol. 28, issue 1, Jan. 2014, 4 pages.
Sainath et al., "Auto-encoder bottleneck features using deep belief networks," in IEEE International Conference on Acoustics, Speech, and Signal Processing (ICASSP), pp. 4153-4156, Mar. 2012.
Sainath et al., "Convolutional, long short-term memory, fully connected deep neural networks," in IEEE International Conference on Acoustics, Speech, and Signal Processing (ICASSP), pp. 4580-4584, Apr. 2015.
Sainath et al., "Deep Convolutional Neural Networks for LVCSR," Acoustics, Speech and Signal Processing (ICASSP), 2013 IEEE International Conference on, pp. 8614-8618, Dec. 2013.
Sainath et al., "Deep convolutional neural networks for LVCSR," in Acoustics, Speech and Signal Processing (ICASSP), 2013 IEEE International Conference on. IEEE, 2013, pp. 8614-8618.
Sak et al. "Sequence Discriminative Distributed Training of Long Short-Term Memory Recurrent Neural Networks," Entropy 15.16, 2014, 5 pages.
Sak et al., "Fast and accurate recurrent neural network acoustic models for speech recognition," arXiv preprint arXiv:1507.06947, Jul. 2015, 5 pages.
Sak et al., "Language model verbalization for automatic speech recognition," in Acoustics, Speech and Signal Processing (ICASSP), 2013 IEEE International Conference on, IEEE, pp. 8262-8266, May 2013.
Sak et al., "Learning Acoustic Frame Labeling for Speech Recognition with Recurrent Neural Networks," 2015 IEEE International Conference on Acoustics, Speech and Signal Processing, Apr. 19, 2015, 5 pages.
Sak et al., "Long Short-Term Memory Based Recurrent Neural Network Architectures for Large Vocabulary Speech Recognition," Feb. 5, 2014, [online] (retrieved from htq2:i/arxiv.org/abs/1402.1128), 5 pages.
Saon et al., "The IBM 2015 English conversational telephone speech recognition system," arXiv preprint arXiv:1505.05899, May 2015, 5 pages.
Schalkwyk et al., ""your word is my command": Google search by voice: A case study," in Advances in Speech Recognition, Springer, Aug. 2010, pp. 61-90.
Senior et al., "Context dependent phone models for LSTM RNN acoustic modelling," in Acoustics, Speech and Signal Processing (ICASSP), 2015 IEEE International Conference on, pp. 4585-4589, Apr. 2015.
Senior et al. "Gmm-free dnn acoustic model training," 2014 IEEE International Conference on Acoustics Speech and Signal Processing, 2014, pp. 5602-5606.
Sercu et al. "HPC Project: CTC loss for RNN speech recognition," May 2015, 8 pages.
Siohan, "Training data selection based on context-dependent state matching," in ICASSP, 2014.

(56) References Cited

OTHER PUBLICATIONS

Song et al., "End-to-End Deep Neural Network for Automatic Speech Recognition," Stanford University, CS224d: Deep Learning for Natural Language Processing, 2015 Report, pp. 1-8.
Soong et al., "A Vector Quantization Approach to Speaker Recognition," 1985 IEEE International Conference on Acoustics, Speech, and Signal Processing, vol. 10, Apr. 1985, 387-390.
Stafylakis et al., "Preliminary investigation of Boltzmann machine classifiers for speaker recognition," in Proc. Odyssey Speaker and Language Recognition Workshop, 2012, 8 pages.
Stafylakis et al., "Text-dependent speaker recognition using PLDA with uncertainty propagation," in Proc. Interspeech, 2013, 5 pages.
Tomar et al., "Efficient manifold learning for speech recognition using locality sensitive hashing," Acoustics, Speech and Signal Processing (ICASSP), 2013 IEEE International Conference on. IEEE, 2013, pp. 6995-6999.
Unknown Author, "Unsupervised Feature Learning and Deep Learning Tutorial: Convolutional Neural Network," Stanford University, publically available before Jun. 12, 2015 [retrieved on Sep. 8, 2015]. Retrieved from the Internet: URL <http://ufldl.stanford.edu/tutorial/supervised/ConvolutionalNeuralNetwork/>, 2 pages.
Vanhoucke et al., "Improving the speed of neural networks on CPUs," in Deep Learning and Unsupervised Feature Learning Workshop, NIPS 2011, 2011; pp. 1-8.
Variani et al., "Deep neural networks for small footprint text-dependent speaker verification," in Acoustics, Speech and Signal Processing (ICASSP), 2014 IEEE International Conference on. IEEE, May 2014, pp. 4080-4084.
Vasilakakis et al., "Speaker recognition by means of deep belief networks." (2013). (Published Oct. 2013; Presented on Oct. 14-15, 2013), 7 pages.
Vesely et al. "Sequence-discriminative training of deep neural networks," in Interspeech, Aug. 2013, 5 pages.
Williams, Gethin, et al. "Speech/Music Discrimination Based on Posterior Probability Features," Submitted to Eurospeech '99, Budapest, 4 pages.
Wollmer et al., "Probabilistic ASR Feature Extraction Applying Context-Sensitive Connectionist Temporal Classification Networks," Acoustics, Speech and Signal Processing (ICASSP), 2013 IEEE International Conference on, pp. 7125-7129, 2013.
Yegnanarayana et al., "AANN: an alternative to GMM for pattern recognition," Neural Networks, 15(3):459-469, 2002.
Young et al., "Tree-based state tying for high accuracy acoustic modelling," in Proc. ARPA Human Language Technology Workshop, pp. 307-312, Mar. 1994.
Yu et al., "Exploiting Sparseness in Deep Neural Networks for Large Vocabulary Speech Recognition," in ICASSP 2012. IEEE SPS, Mar. 2012, pp. 4409-4412.
Yu et al., "Unsupervised training and directed manual transcription for LVCSR," Speech Communication, vol. 52, No. 7-8, pp. 652-663, Jul. 2010.
Zeiler et al., "On rectified linear units for speech processing," in 38th International Conference on Acoustics, Speech and Signal Processing (ICASSP), 2013.
"Artificial neural network," From Wikipedia, the free encyclopedia, last modified on Oct. 4, 2015 [retrieved on Oct. 8, 2015], Retrieved from the Internet: URL<https://en.wikipedia.org/wiki/Artificial_neural_network>, 14 pages.
"Convolutional neural network," From Wikipedia, the free encyclopedia, last modified on Sep. 10, 2015 [retrieved on Oct. 8, 2015], Retrieved from the Internet: URL<https://en.wikipedia.org/wiki/Convolutional_neural_network>, 9 pages.
"Locality-Sensitivity Hashing," Wikipedia, downloaded from the internet on Jun. 16, 2014, 7 pages, https://en.wikipedia.org/wiki/Locality-sensitive_hashing.
"Long short-term memory," From Wikipedia, the free encyclopedia, last modified on Oct. 5, 2015 [retrieved on Oct. 8, 2015], Retrieved from the Internet: URL<https://en.wikipedia.org/wiki/Long_short-term_mernory>, 4 pages.
Breuel. "Benchmarking of LSTM networks," arXiv preprint arXiv 1508.02774v1, Aug. 11, 2015, 17 pages.
Graves et al. "Speech Recognition with Deep Recurrent Neural Networks," arXiv Preprint arXiv 1303.5778v1, Mar. 22, 2013, 5 pages.
Varian et al., "Deep neural networks for small footprint text-dependent speaker verification," in Acoustics, Speech and Signal Processing (ICASSP), 2014 IEEE International Conference on. IEEE, May 2014, pp. 4080-4084.
Zeller et al., "On rectified linear units for speech processing," in 38th International Conference on Acoustics, Speech and Signal Processing (ICASSP), 2013.
Sak et al., "Long Short-Term Memory Based Recurrent Neural Network Architectures for Large Vocabulary Speech Recognition," Feb. 5, 2014, [online] (retrieved from htq2:i/arxiv.org/abs/1402.1 I28), 5 pages.

\* cited by examiner

400

ACCESSING A CONNECTIONIST TEMPORAL CLASSIFICATION (CTC) ACOUSTIC MODEL THAT HAS BEEN TRAINED USING PHONETIC ALIGNMENTS DETERMINED BY ANOTHER CTC ACOUSTIC MODEL  402

RECEIVING AUDIO DATA FOR A PORTION OF AN UTTERANCE  404

PROVIDING INPUT DATA BASED ON THE AUDIO DATA TO THE ACCESSED CTC ACOUSTIC MODEL  406

GENERATING DATA INDICATING A TRANSCRIPTION FOR THE UTTERANCE BASED ON OUTPUT OF THE ACCESSED CTC ACOUSTIC MODEL  408

PROVIDING THE DATA INDICATING THE TRANSCRIPTION AS OUTPUT OF AN AUTOMATED SPEECH RECOGNITION SYSTEM  410

FIG. 4

TRAINING ACOUSTIC MODELS USING CONNECTIONIST TEMPORAL CLASSIFICATION

CROSS-REFERENCE TO RELATED APPLICATION

This U.S. patent application is a continuation of, and claims priority under 35 U.S.C. § 120 from, U.S. patent application Ser. No. 16/258,309, filed on Jan. 25, 2019, which is a continuation of U.S. patent application Ser. No. 15/397,327, filed on Jan. 3, 2017, which claims priority under 35 U.S.C. § 119(e) to U.S. Provisional Application 62/273,618, filed on Dec. 31, 2015. The disclosures of these prior applications are considered part of the disclosure of this application and are hereby incorporated by reference in their entireties.

BACKGROUND

Many speech recognition systems use acoustic models to transcribe utterances. Typically, acoustic models provide information about the sounds or phonetic units that are included in an utterance.

SUMMARY

In some implementations, an acoustic model can be trained to identify context-dependent (CD) phones using the connectionist temporal classification (CTC) technique. The model can be generated using a CD phone inventory determined using another CTC acoustic model trained to identify context-independent (CI) phones. The CTC training process does not use fixed alignment targets for training the C acoustic model, and as a result, the phonetic alignments determined are approximate rather than exact. Nevertheless, using many training examples, statistics generated from the approximate alignments can be used to determine a CD phone inventory that allows high accuracy of the CD acoustic model.

The training process may include "flat start" training, in which the CTC models do not rely on any other acoustic model (e.g., GMM, DNN, or other non-CTC acoustic model) and do not use any previously determined phonetic alignments or CD phone information. The CTC acoustic models may be trained from acoustic data and non-phonetically-aligned word-level transcriptions of the acoustic data. For example, the C phone may be trained directly from written-domain word transcripts by aligning with all possible phonetic verbalizations.

In one general aspect, a method of performing speech recognition includes: accessing, by the one or more computers of the speech recognition system, a connectionist temporal classification (CTC) acoustic model that has been trained using a context-dependent state inventory generated from approximate phonetic alignments determined by another CTC acoustic model trained without fixed alignment targets, the accessed CTC acoustic model being configured to provide outputs corresponding to one or more context-dependent states; receiving, by the one or more computers of the speech recognition system, audio data for a portion of an utterance; providing, by the one or more computers of the speech recognition system, input data corresponding to the received audio data as input to the accessed CTC acoustic model that has been trained using the context-dependent state inventory generated from the approximate phonetic alignments determined by the other CTC acoustic model; generating, by the one or more computers of the speech recognition system, data indicating a transcription for the utterance based on output that the accessed CTC acoustic model produced in response to the input data corresponding to the received audio data; and providing, by the one or more computers of the speech recognition system, the data indicating the transcription as output of the automated speech recognition system.

Other embodiments of this and other aspects include corresponding systems, apparatus, and software programs, configured to perform the actions of the methods, encoded on computer storage devices. A device or system of devices can be so configured by virtue of software, firmware, hardware, or a combination of them installed so that in operation cause the system to perform the actions. One or more software programs can be so configured by virtue of having instructions that, when executed by data processing apparatus, cause the apparatus to perform the actions.

Implementations may include one or more of the following features. For example, in some implementations, receiving the audio data includes receiving the audio data from a client device over a computer network; and providing the data indicating the transcription includes providing the data indicating the transcription to the client device over the computer network.

In some implementations, providing the data indicating the transcription includes live streaming speech recognition results such that the data indicating the transcription is provided while the one or more computers concurrently receive audio data for an additional portion of the utterance.

In some implementations, the accessed CTC acoustic model is a unidirectional CTC acoustic model and the other CTC acoustic model is a bidirectional CTC acoustic model.

In some implementations, the accessed CTC acoustic model includes a recurrent neural network including one or more long short-term memory layers, and the other CTC acoustic model includes a recurrent neural network including one or more long short-term memory layers.

In some implementations, accessing the CTC acoustic model includes accessing a CTC acoustic model configured to provide outputs that identify labels for triphones or to provide outputs that include scores for labels for triphones.

In some implementations, accessing the CTC acoustic model includes accessing a CTC acoustic model that is trained independent of non-CTC acoustic models.

In some implementations, accessing the CTC acoustic model includes accessing a CTC acoustic model trained to recognize multiple different pronunciations of a word using a pronunciation model that indicates multiple different phonetic sequences as valid pronunciations of the word.

In some implementations, accessing the CTC acoustic model includes accessing a CTC acoustic model trained to recognize multiple different verbalizations of a written word using a verbalization model that indicates multiple different spoken words as valid verbalizations of the written word.

In another general aspect, a method of training an acoustic model includes: accessing, by the one or more computers, training data including audio data corresponding to utterances and transcriptions for the utterances; training, by the one or more computers, a first connectionist temporal classification (CTC) acoustic model to indicate labels for context-independent states; using, by the one or more computers, the first CTC acoustic model to determine approximate alignments between the audio data in the training data and phonetic sequences corresponding to the transcriptions in the training data; determining a set of context-dependent states based on the approximate alignments determined using the first CTC acoustic model; and training, by the one or more computers, a second CTC acoustic model to indicate labels for the context-dependent states in the determined set of context-dependent states.

Implementations may include one or more of the following features. For example, in some implementations, the first CTC acoustic model is a bidirectional CTC acoustic model and the second CTC acoustic model is a unidirectional CTC acoustic model.

In some implementations, the first CTC acoustic model includes a recurrent neural network including one or more long short-term memory layers, and the second CTC acoustic model includes a recurrent neural network including one or more long short-term memory layers.

In some implementations, the context-dependent states are triphones.

In some implementations, using the first CTC acoustic model to determine the approximate alignments includes determining an approximate alignment of an input sequence with a graph representing all possible alternative target label sequences.

In some implementations, training the first CTC acoustic model and training the second CTC acoustic model are performed independent of any other acoustic models.

In some implementations, training the first CTC acoustic model includes training the first CTC acoustic model to recognize multiple different pronunciations of a word using a pronunciation model that indicates multiple different phonetic sequences as valid pronunciations of the word.

In some implementations, training the first CTC acoustic model includes training the first CTC acoustic model to recognize multiple different verbalizations of a written word using a verbalization model that indicates multiple different spoken words as valid verbalizations of the written word.

Advantageous implementations can include one or more of the following features. The speed of acoustic model generation can be significantly reduced. In some implementations, the amount of time and computation required to train CTC models using the disclosed flat start techniques is less than half of what is needed to generate a corresponding GMM and DNN models from audio data and word-level transcriptions. The increase in training speed facilitates model refreshes that update the pronunciations recognized by the acoustic model or use different sets of training data. The ability to quickly and efficiently update a model can allow the most up-to-date pronunciations and verbalizations are used, as well as current or expanded training data, increasing the accuracy of speech recognition results provided to users. Users can benefit from live-streaming continuous speech recognition which is not available for all CTC model implementations.

In general, CTC models generally have not been considered appropriate as the initial model to train directly from audio data and word-level transcriptions. Instead, prior approaches have trained GMM, DNN, and other types of models. As discussed below, the techniques herein allow a first CTC model to be trained without fixed alignment targets, e.g., without any a priori knowledge of alignment between audio and a transcription. After training, the alignments that this first CTC model produced may vary from the actual best alignments. This variance suggests that this type of CTC model would not be effective to determine context-dependent state inventories or to use in further training an acoustic model. Accordingly, the generation of an acoustic model using only CTC techniques has not been considered to be a viable option. However, the present disclosure shows below that the approximate alignments generated by the first CTC model can be used to effectively train a second CTC model to perform with high speech recognition accuracy, despite potential inaccuracies in the alignments determined by the first CTC model.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 is a flow diagram of a process for performing speech recognition.

Like reference numbers and designations in the various drawings indicate like elements.

DETAILED DESCRIPTION

Figure 1:
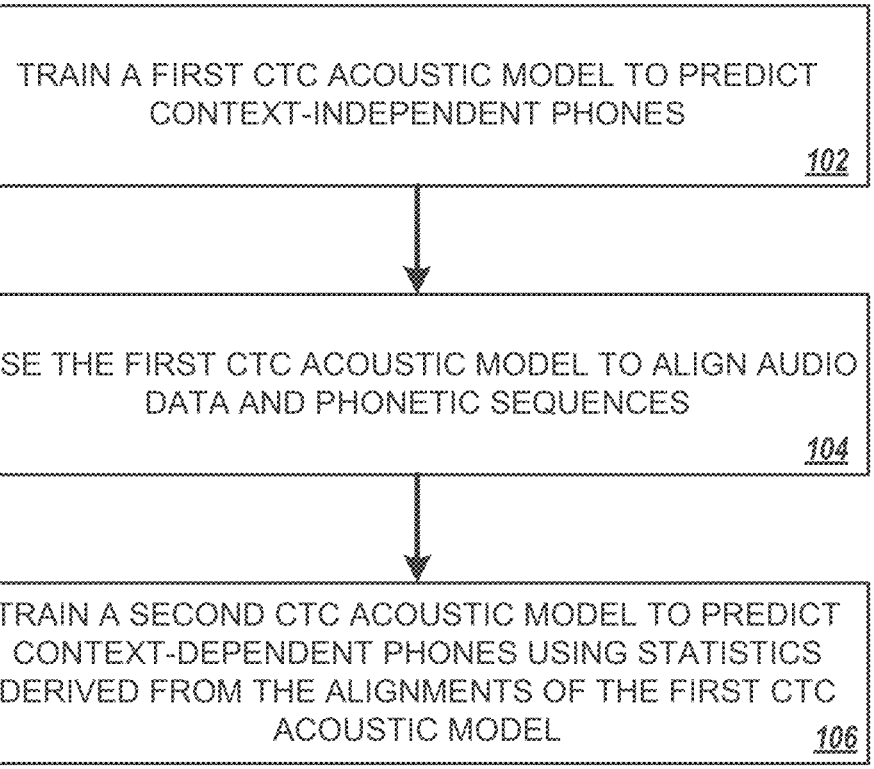
FIG. 1 is a flow diagram that illustrates an example of a process for training an acoustic model.

In some implementations, acoustic models can be trained with context dependent (CD) phones using recurrent neural networks (RNNs). First, the connectionist temporal classification (CTC) technique is used to train a model with context independent (CI) phones directly from written-domain word transcripts by aligning with all possible phonetic verbalizations. Then, a set of CD phones is generated using the CTC CI phone model alignments and train a CD phone model to improve the accuracy. This end-to-end training process does not require any previously trained GMM-HMM or DNN model for CD phone generation or alignment, and thus significantly reduces the overall model building time. Similarly, this procedure does not degrade the performance of models and allows models to be improved more quickly by updates to pronunciations or training data.

Many large-scale vocabulary speech recognition systems employ neural network acoustic models which are commonly feedforward deep neural networks (DNNs) or deep recurrent neural network (RNNs) such as Long Short Term Memory (LSTM) networks. These 'hybrid' models assume a Hidden Markov Model (HMM) for which the neural network predicts HMM state posteriors. A variation of LSTM-HMM is the CLDNN, a DNN that includes a convolutional layer, one or more LSTM layers, and a DNN. The CLDNN uses a convolutional layer in addition to LSTM layers and can perform better than LSTM RNNs. However, these acoustic models are typically trained with cross entropy (CE) loss, which requires an alignment between acoustic frames and phonetic labels. The alignment could be obtained from a Gaussian mixture model (GMM) or a neural network initially aligned with a GMM-HMM. The initial "bootstrapping" model is used in two ways: (i) for generating alignments and (ii) for building a context dependency tree. A GMM-HMM model can be 'flat started' from the phonetic transcriptions, and the phone alignments from the initial GMM-HMM can be used to build context-dependent phone models for improving accuracy.

The conventional neural network acoustic models require training a GMM-HMM and sometimes even an initial neural network to obtain acceptable alignments. These training iterations can take a long time, often a few weeks. A lengthy acoustic model training procedure not only delays the deployment of improved models but also hinders timely refresh of acoustic models. Being able to flat start an LSTM RNN, e.g., to fully train a model without dependence on any prior model, is desirable since it eliminates the need for a GMM, simplifying and shortening the training procedure. Below, a GMM-free training approach for DNN-HMM is described in where DNNs are flat-started and their alignments are used for building CD state-tying trees. The flat start procedure for LSTM RNNs can involve training with the CTC objective function. For example, based on the principle of maximum likelihood, minimizing the CTC objective function maximizes the log likelihoods of the target labelings. The objective function depends only on the sequence of labels, and not on their duration or segmentation.

The CTC technique can be very effective at phoneme recognition and large vocabulary speech recognition. CTC models have the advantage of not needing alignment information, since they can be trained directly with phonetic transcriptions. However, phonetic transcriptions of words cannot be obtained readily from the text transcription because there may be multiple verbalizations of the same word. For example, the number "10" may be pronounced "ten" or "one oh." Further, each verbal word may have multiple valid pronunciations. Thus, a text transcription may have many valid phonetic transcriptions. The true spoken phoneme labels can be obtained by aligning the audio and the alternative pronunciations with an existing acoustic model, however, this relies on training a GMM-HMM or DNN-HMM which results in the same lengthy training procedure as with the conventional neural network models.

As discussed below, RNN phone acoustic models can be trained using the CTC technique directly from transcribed audio and text data, without requiring any fixed phone targets generated from a previous model. In addition, a CD phone inventory can be built using a CTC-based phone acoustic model. Using these techniques, a CTC CI phone model can be flat-start trained and used to build a CD phone inventory. Then, a CTC CD phone model can be trained using the CD phone inventory. This procedure can be useful to quickly refresh acoustic models whenever other components of the speech system (such as the pronunciations) are updated.

FIG. 1 is a flow diagram that illustrates an example of a process 100 for training an acoustic model. In some implementations, an end-to-end procedure can be used to quickly train and/or refresh acoustic models using the flat start training of CTC models. First, a bidirectional LSTM RNN model, is trained with the flat start CTC technique to predict phonemes (102). This model is used as an intermediate model used to later train one or more unidirectional models for real-time streaming speech recognition. Second, the bidirectional CTC model is used to align the acoustic model training data to obtain the phonetic alignments and the statistics associated with the phone label spikes are used to create context-dependent phones (104). Third, a unidirectional LSTM RNN, is trained with the flat start CTC technique to predict these context-dependent phones (106). This unidirectional model is trained to predict context-dependent phones, using CTC labels and techniques.

In further detail, the connectionist temporal classification (CTC) approach is a learning technique for sequence labeling using RNNs, allowing the RNNs to learn an alignment between the input and target label sequences. Unlike conventional alignment learning, the CTC introduces an additional blank output label. The model can choose to predict the blank output label instead of a phoneme label and thus relax the decision of labeling each input. This is effective for acoustic modeling since speech decoding does not require labeling each acoustic frame phonetically A CTC-based acoustic model may listen to several acoustic frames before outputting a non-blank label, which represents a phonetic unit in this case.

In some instances, the outputs of CTC models can be represented as series of phone label "spikes" or designations, where each spike indicates the position in a sequence where the corresponding phone label is most appropriate, according to the model's calculations. In some implementations, each phone in a sequence has a single phone label spike to indicate the occurrence of the phone. The phone labels are generally indicated in the sequence that they occur in the phonetic transcription, but with a spacing, delay, and addition of blank labels being determined by the model.

Figure 2:
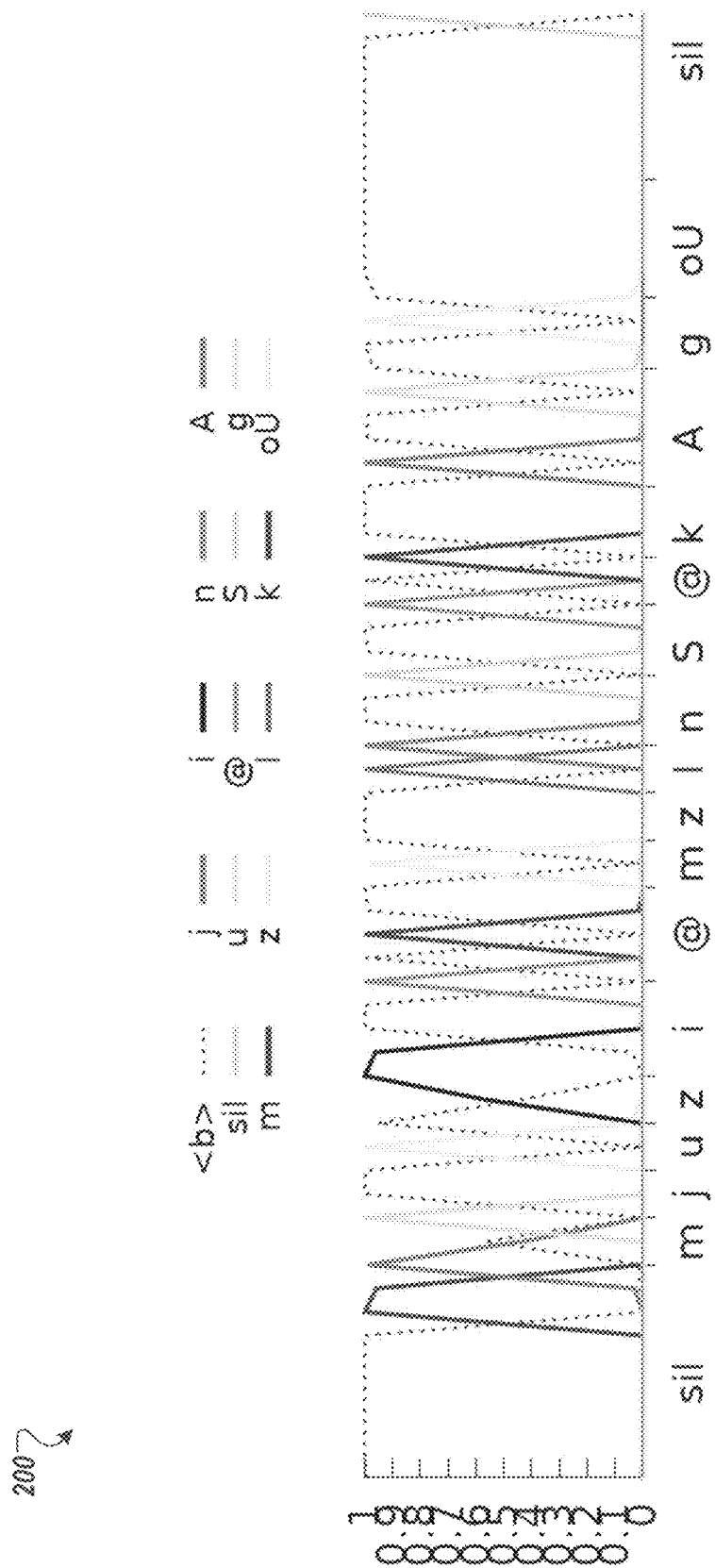
FIG. 2 is a diagram that illustrates an example of phone labels from an acoustic model.

An example of spikes corresponding to CI labels is shown in FIG. 2. The chart 200 of FIG. 2 shows the timing of C phone spikes from a BLSTM-CTC-CI model for an example utterance with the transcript 'museums in Chicago' The x-axis shows the phonetic alignments as obtained with a DNN model and y-axis shows the phone posteriors as predicted by the CTC model. The CTC phone spikes are close to the time intervals generated by DNN phone alignments.

The CTC loss function attempts to optimize the total likelihood of all possible labelings of an input sequence with a target sequence. It calculates the sum of all possible path probabilities over the alignment graph of given sequences using the forward backward algorithm. The alignment graph allows label repetitions possibly interleaved with blank labels. When applied to acoustic modeling in this sequence labeling framework, this approach requires phonetic transcriptions of utterances which necessitates a previously trained acoustic model. Any significant change in training (such as updates to training data or word pronunciations) would require re-training all the acoustic models starting from the initial model used to obtain the phonetic transcriptions.

The CTC technique can be easily extended to align an input sequence with a graph representing all possible alternative target label sequences. This is useful, for instance, in flat start training of acoustic models where there are word-level transcripts in the written domain for training utterances, but the actual verbal forms of the words and phonetic transcriptions of an utterance are not known. Note that there can be multiple possible verbal expansions of words, and similarly potentially multiple phonetic pronunciations of words. The CTC approach may be extended to learn a probabilistic alignment over all possible phonetic sequence representations corresponding to all the verbal forms of a written text transcript.

Standard CTC techniques can be implemented using a finite state transducer (FST) framework by building an FST representation, P, for a given target phone sequence and another auxiliary transducer. C, allowing for optional blank label insertions and actual label repetitions. Then, the composed transducer C∘P represents a graph which can be used to align the input. For flat start training of CTC models, the technique can be altered by using C∘L∘V∘T, where T is the FST representation for the given target word level transcript. V is a verbalization FST, L is a pronunciation lexicon FST. Given the pronunciation and verbalization models as L and V, a computing system can train acoustic models directly from the acoustic data and corresponding word transcripts in the written form using the forward backward algorithm to align the input with this composed FST representation.

To ensure that flat start training of CTC acoustic models does not degrade speech recognition accuracy, the performance of the flat-start CTC model can be compared with performance of a CTC model trained with phonetic alignments generated by a DNN model. In many instances, the performance of the CTC model trained with the flat start technique is at least as good as the other models. In addition, the flat start training procedure does not require any previous model, which is more convenient and reduces the overall training time.

In some implementations, an end-to-end procedure to quickly train and refresh acoustic models using the flat start training of CTC models includes the actions of the process shown in FIG. 1. First, a bidirectional LSTM RNN model, BLSTM-CTC-CI, is trained with the flat start CTC technique to predict phonemes (102). This model is used as an intermediate model used to later train one or more unidirectional models for real-time streaming speech recognition. Second, the BLSTM-CTC-CI is used to align the acoustic model training data to obtain the phonetic alignments and the statistics associated with the phone label spikes are used to create context-dependent phones (104). Third, a unidirectional LSTM RNN, CD-CTC-sMBR, is trained with the flat start CTC technique to predict these context-dependent phones (106). This is a model that predicts context-dependent phones, using CTC labels and techniques, that has been trained using state-level minimum Bayes risk (sMBR) sequence discriminative criteria. This unidirectional model is the final model used for speech recognition. Other sequence discriminative criteria may be used in addition to or instead of sMBR, such as maximum mutual information (MMI), minimum phone error (MPE), or boosted MMI.

In general, the label probabilities used for CTC are assumed to be conditioned on the entire input sequence. In practice, if the network is unidirectional, the label probabilities at time t only depend on the inputs up to t. The network must therefore wait until after a given input segment is complete (or at least sufficiently complete for a portion to be identified) before emitting the corresponding label. For framewise classification, with a separate target for every input, one way of incorporating future context into unidirectional networks was to introduce a delay between the inputs and the targets. Unidirectional CTC networks can use a variable delay, chosen by the network according to the segment being labelled.

In further detail, training a BLSTM-CTC-CI model allows the model to be used for building a CD phone inventory. Speech recognition systems typically predict context-dependent labels such as triphones since the added context restricts the decoding search space and results in better word error rates. However, in order to build a CD phone inventory a trained CI phone acoustic model is needed.

The bidirectional LSTM (BLSTM) can be trained using flat start CTC to predict context-independent (CI) phone labels. The flat start technique allows training of the model independent of any other previously generated model, and without any non-CTC models. Additionally, it allows training without information about any previously determined alignments between audio data and phonemes, so that training is done directly from audio samples and corresponding word-level transcriptions. As mentioned earlier, this training only requires a verbalization model, a pronunciation model, and transcribed acoustic model training data (e.g., audio data for utterances and corresponding word-level transcriptions). In general, a verbalization model may include mappings between written forms of words (e.g., graphemes) to different spoken forms of words (e.g., verbal words). For example, the verbalization model may map the text "10" to each of the different spoken words "ten" and "one oh." Similarly, a pronunciation model may include mappings between words to phoneme sequences. A word may be mapped to multiple different phoneme sequences that each represent a valid pronunciation of the word.

The performance of this BLSTM-CTC-CI model is measured by its phoneme error rate. This bidirectional model is used only to generate statistics about context-dependent phone labels which can be used to establish a CD phone inventory. The CI model is trained as a bidirectional network since bidirectional networks can perform better than unidirectional models, are faster to train, and the alignments better matches the actual timing of acoustic frames. Bidirectional CTC models generally require large amounts of context, in some instances receiving an entire utterance for analysis before providing estimated labels. This permits the model to assign a sequence of labels to audio data looking from the beginning of the audio data forward in time, as well as from the end of the audio data backward in time. Because of the large amount of context used by the bidirectional approach, the bidirectional model is not appropriate for real-time or continuous speech recognition because the bidirectional model would cause excessive latency between receipt of audio data and output of the acoustic model. In essence, a user would need to complete an utterance before the recognition process could begin. Accordingly, unidirectional models, which look at audio from the beginning and forward in time, are used for live streaming recognition results to maintain an acceptable latency.

Once the BLSTM-CTC-CI has reached a reasonable phoneme error rate through training, a computing system re-aligns the training data to generate the CD phones. Models may model various phonetic units. Some approaches model whole phones, and others model HMM states. While the discussion herein refers to CI phones and CD phones, CI states and CD states that represent more or less than an entire phone may be used. For example, instead of CI phones, CI states representing a portion of a phone (e.g., one of multiple HMM states that make up a phone) may alternatively be modeled. In this scenario, the CD states may represent a sub-phone state in the context of other sub-phone states. When whole-phone modeling is used, a minimum duration of a phone may be enforced. In one example, context-dependent phones (e.g., triphones or other sequences) are generated using whole-phone modeling while constraining the minimum durations of phones, and using the hierarchical binary divisive clustering algorithm for context tying.

Using the trained BLSTM-CTC-CI, the computing system performs a Viterbi forced alignment to obtain a set of frames with phone labels (and many frames with blank labels). This alignment can be performed for each of the utterances used as training data. This allows the computing system to find sufficient statistics for all the frames with a given phone label and context. The sufficient statistics are, for example, the mean and diagonal covariance of input log-mel filterbanks features for labelled frames. In some implementations, if two or more frames are aligned for a phoneme, only the initial frame to generate statistics. Other variations may be used, for example, using all frames to generate statistics.

The CD phones can be organized or grouped using decision trees. One tree per phone is constructed, with the maximum-likelihood-gain phonetic question being used to split the data at each node. The forest consisting of all phone-trees is pruned to a fixed number of CD phones by merging the two CD phones with the minimum gain. Beyond a certain number (500 for Russian) having more CD phones does not improve the accuracy and the smallest CD phone inventory with the best performance is selected.

Although the CTC does not guarantee the alignment of phone label spikes with the corresponding acoustic input frames, we find the alignments of a bidirectional model to be generally accurate in the aggregate. While individual alignments are likely to vary somewhat from the actual alignment, the offsets generally cancel out and statistics generated using outputs for a training data set generally reflect accurate alignment characteristics. However, this is not true for the unidirectional phone models, which generally chose to delay phone predictions (typically around 300 ms). In some implementations, the CTC phone spikes are close to the phone time intervals obtained by aligning with a DNN model that uses a large context window (250 ms).

Using the generated CD phone inventory, the computing system trains a unidirectional CTC model (e.g., a CD-CTC-sMBR model) predicting the CD phones identified using the trained bidirectional CTC model. A context dependency transducer, D, is constructed from the CD phone inventory, that maps CD phones to CI phones. Then, the flat start technique with CTC is repeated for CD phones using the composed transducer graph $C \circ D \circ L \circ V \circ T$. After the CTC model training converges fully (e.g., within a predetermined threshold), the model can be further improved by training with the sMBR sequence discriminative criterion. One may choose to train a bidirectional CD phone model, however, such a model does not allow for live streaming of speech recognition results.

Various aspects of an example system will now be described. For example, LSTM networks may be trained using a dataset that includes thousands or even millions of utterances and corresponding transcriptions (e.g., human-transcribed or automatically machine transcribed transcriptions). The set of acoustic features used can be an 80-dimensional log mel filterbank energy vector determined every 10 ms, with eight such feature sets being stacked resulting in a 640-dimensional input feature vector for the CTC models. In some implementations, some vectors are skipped. For example, the system can skip two in every three such vectors. This results in a single input feature vector every 30 ms. This mechanism of frame stacking and skipping may be optimized for CTC acoustic models.

The system can clip or constrain the activations of memory cells to a range, such as [−50, 50], and the gradients of the memory cells can also be limited to a range, such as [−1, 1]. This makes training with CTC models more stable.

For the BLSTM-CTC-CI model, in some implementations, a deep LSTM RNN with 5 layers of forward and backward layers of 300 memory cells is used. For the CD-CTC-sMBR LSTM, a 5-layer deep RNN with forward layers of 600 memory cells may be used. CTC training for all models may be done with a learning rate of, for example, 0.0001 with an exponential decay of one order of magnitude over the length of training.

To ensure robustness to background noise and reverberant environments, each training example may be synthetically distorted using a room simulator with a virtual noise source. Noise may be taken from any of various sources, such as the audio of publicly available Internet videos (e.g., YouTube videos). In some implementations, each training example is randomly distorted to get 20 variations. This 'multi-condition training' also prevents overfitting of CTC models to training data. To estimate the performance of acoustic models, noisy versions of the test sets can be generated in a similar manner.

The final trained models may be used or evaluated in a large vocabulary speech recognition system. For decoding, a wide beam search may be used to avoid search errors. After a first pass of decoding using the CTC models with a 5-gram language model heavily pruned, lattices are rescored using a large 5-gram language model. Models may be evaluated based on their word error rate (WER) on clean and noisy test sets. In various experiments, a CD-CTC-sMBR model outperformed other models, such as a CD-CLDNN-sMBR model (e.g., a context-dependent convolutional long-short term memory deep neural network trained with In some implementations, the training approach discussed herein provides the ability of the model to learn multiple pronunciations. With flat start CTC training, the computing system does not provide fixed phoneme targets during CTC training. Instead, all possible valid pronunciations for the given transcript are available to the network. The network can decide which of the valid pronunciations to predict for a given training example. Analysis of model outputs after training confirm that the network is indeed able to utilize multiple valid pronunciations, as trained models frequently use different pronunciation variants for tested words.

In some implementations, the training approach discussed herein facilitates rapid refreshing of the acoustic model. Three major components are often included in a speech recognition system: an acoustic model, a pronunciation model, and a language model. Although during runtime or use in recognizing user speech all these models are used together, they are generally trained and improved independently. Often an improvement in one system may necessitate refreshing the others. A common example of this when new word pronunciations are added, the acoustic models may need to be refreshed to take advantage of the new pronunciations.

As an example, the pronunciations used during acoustic model training may contain incorrect pronunciations, especially if the pronunciations are generated using an automated tool. This would result in the acoustic model learning to predict these incorrect phonetic transcriptions. If, at a later time, these incorrect pronunciations are corrected then a WER regression may result from a mismatch between the updated pronunciation and the previously trained acoustic model.

A refresh of the acoustic model (e.g., additional training or adaptation) would generally be required to take advantage of the new pronunciations. The new pronunciations would have new alignments with audio data. If an acoustic model were trained based on alignments from a GMM, the GMM would have to be retrained, which would require a significant amount of time and computation. However, with CTC models that do not require a GMM, the flat start CTC procedure can be used to quickly update the acoustic models.

As discussed above, the CTC training technique can be extended to allow training of phoneme models directly from written transcripts. A computing system can use this mechanism to train a bidirectional CTC phone model which is used to generate a CD phone inventory. The computing system can then train a CD model, such as a CD CTC-sMBR LSTM RNN model, using this CD phoneme inventory. This approach is language independent and can provide accuracy improvements and significant decreases in training time for many different languages. Notably, the end-to-end flat start CTC training procedure is faster than training a GMM-HMM model to bootstrap and train a neural network model. Additionally, a computing system using these techniques can efficiently train and refresh state-of-the-art acoustic models from scratch in a relatively short time.

Figure 3:
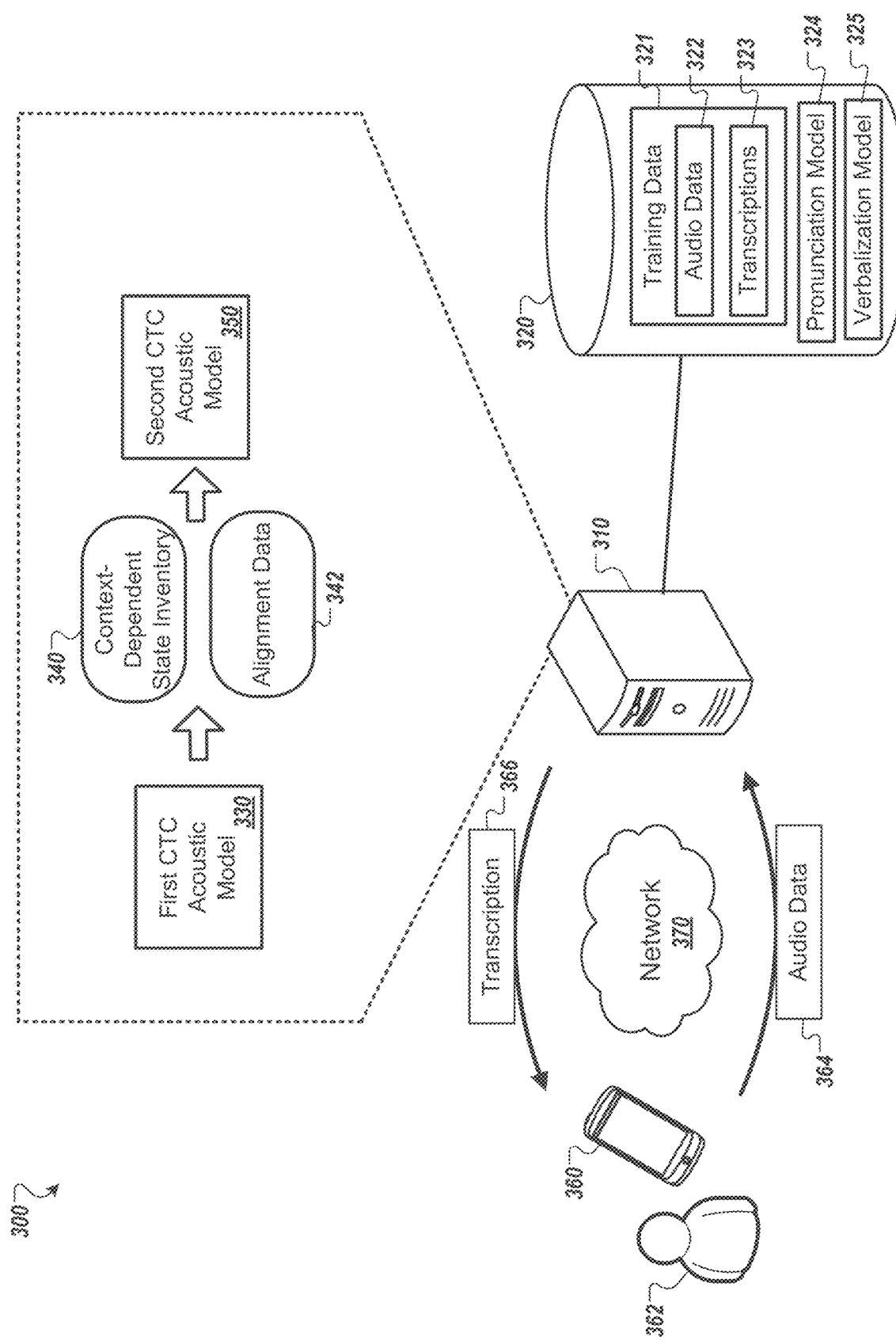
FIG. 3 is a diagram of an example of a system for training and using an acoustic model.

FIG. 3 is a diagram of an example of a system 300 for training and using an acoustic model. The system 300 includes a computing system 310, which can represent one or more computers which may be at a single location or distributed over multiple locations. The example of FIG. 3 illustrates the computing system 310 training a CTC acoustic model 350 from a set of training data using a flat start technique. In other words, the computing system 310 trains the CTC acoustic model 350 in a manner that does not depend on any other non-CTC acoustic models. The computing system 310 then uses the trained CTC acoustic model 350 to perform speech recognition for speech provided by a user device 360 over a network 370.

The computing system 310 accesses one or more data storage devices 320 that store training data 321. The training data 321 includes audio data 322 and transcriptions for the audio data. There is no need for the transcriptions to be aligned with the audio data 322. The computing system 310 also accesses a pronunciation model 324 and a verbalization model 325, and uses the models 324, 325 to determine phonetic sequences for the transcriptions. For example, the computing system 310 determines a phone sequence for each example in the training data. In some instances, a single transcription may produce multiple different phone sequences to reflect different ways of speaking the words of the transcription.

The computing system 310 uses the phone sequences and the audio data to train a first CTC acoustic model 330. As discussed above, this first model 330 can be a recurrent neural network model, such as one that includes one or more LSTM layers. The first model 330 can also be a bidirectional model. For each training example, the input to the first model 330 can be a series of feature vectors each describing a frame of the audio data, and the corresponding target output can be the phone sequence for the training example. The computing system 310 can use the entire phonetic sequence corresponding to a training example to adjust the parameters of the first model 330 to predict the sequence of phones.

During training of the first model 330, there are no fixed alignment targets for the relationship between the phone sequences and the audio data. The model 330 learns approximate alignments through the training process. The constraints used for training are CTC constraints, such as a requirement to indicate each phone in the phone sequence, in the order indicated by the phone sequence. However, the model 330 is allowed to vary the alignment or timing of phone indications with respect to the audio frame input, and the model 330 is permitted to indicate that a "blank" label, which does not represent a phone, is appropriate and thus wait to indicate a phone occurrence. Generally, the model 330 is trained to indicate likelihoods for context-independent states, e.g., individual phones.

After training the first model 330, the computing system 310 uses the first model 330 to determine a context-dependent state inventory 340. The computing system 310 also uses the first model 330 to generate alignment data 342 indicating alignments between the audio data 322 and the transcriptions 323 in the training data 321. The alignments indicated by the alignment data 342 are approximate, and may vary from an actual alignment. However, the bidirectional nature of the first model 330 and the CTC constraints allow the first model 330 to provide a sufficient level of accuracy. Further, across a large set of training data, inaccuracies in alignment in certain examples have minimal effects on the performance of models trained using the data.

The computing system 330 uses the context-dependent state inventory 340 and the alignment data 342 to train a second CTC acoustic model 350. The second model 350 is a unidirectional recurrent neural network, which can include one or more LSTM layers. The unidirectional nature of the second model 350 allows it to be effective for live-streaming recognition, e.g., substantially real-time transcription tasks where words of a transcription are provided while a user continues speaking. The second model 350 does not need to receive data for the whole utterance before indicating likely context-dependent states based on the data provided so far.

Once the second model 350 has been trained, the computing system 310 can use the second model 350 for speech recognition. In addition, or as an alternative, the computing system 310 can provide the trained second model 350 to another device or system. In the example of FIG. 1, a user 362 speaks and a user device 360 records the audio. The user device 360 sends audio data 364 for the utterance to the computing system 310 over a network 370. The computing system 310 divides the audio data 364 into frames, and determines a set of feature values for each frame. For example, the feature values can be log-Mel frequency cepstral coefficients. The computing system 310 provides the sets of feature values as input to the second CTC acoustic model 350 and receives, as output of the model 350, values indicating likelihoods corresponding to different context-dependent phones. For example, an output layer of the model 350 may have a value corresponding to each of the different context-dependent phones in the state inventory 340 and also an output value for the blank label.

From the outputs of the second model 350, the computing system 310 determines likely sequences of phones and provides the information to a language model. The language model provides scores that indicate likelihoods that different candidate words or sequences of words were spoken, given the likely phone sequences determined from the output of the second model 350. From among various candidate word sequences, the candidate with the highest likelihood indicated by the language model scores can be selected as a transcription. Other techniques may additionally or alternatively be used to determine a transcription.

The computing system 310 provides the transcription to the client device 360 over the network 370. The transcription can then be displayed, added to a document, submitted to an application, or otherwise used by the client device 370.

FIG. 4 is a flow diagram of a process 400 for performing speech recognition. The process 400 can be performed by one or more computers of a speech recognition system, which may be a server system or other computing system.

A connectionist temporal classification (CTC) acoustic model is accessed (402). The accessed CTC acoustic model is configured to provide outputs corresponding to one or more context-dependent states. The accessed CTC model has been trained using a context-dependent state inventory generated from approximate phonetic alignments determined by another CTC acoustic model. The other CTC acoustic model is a model trained without fixed alignment targets. In some implementations, the accessed CTC acoustic model is a unidirectional CTC acoustic model and the other CTC acoustic model is a bidirectional CTC acoustic model.

The accessed CTC acoustic model may include a recurrent neural network comprising one or more long short-term memory layers. The other CTC acoustic model may include a recurrent neural network comprising one or more long short-term memory layers. The accessed CTC acoustic model may be configured to provide outputs that identify labels for triphones or to provide outputs that include scores for labels for triphones. Similarly, the accessed CTC acoustic model may be configured to indicate labels or scores for different sequences of multiple states, such as the occurrence of a particular state before another specific state and after another specific state.

The accessed CTC acoustic model can be a CTC acoustic model that is trained independent of non-CTC acoustic models. The accessed CTC acoustic model can be a model trained to recognize multiple different pronunciations of a word using a pronunciation model that indicates multiple different phonetic sequences as valid pronunciations of the word. The accessed CTC acoustic model can be a model trained to recognize multiple different verbalizations of a written word using a verbalization model that indicates multiple different spoken words as valid verbalizations of the written word.

Audio data for a portion of an utterance is received (404). For example, a speech recognition system may receive audio data representing a word or portion of a word that a user spoke. In some implementations, the speech recognition receives the information over a network, such as the Internet.

Input data corresponding to the received audio data is provided as input to the accessed CTC acoustic model (406). For example, a set of feature values generated from the audio data may be determined and provided as input to the accessed CTC acoustic model. The feature values may be, for example, log-Mel frequency cepstral coefficients. A set of feature values may be provided for each frame of the audio data, with each frame representing a segment of the utterance, e.g., 20 milliseconds, 50 milliseconds, etc.

Data indicating a transcription for the utterance is generated based on output that the accessed CTC acoustic model produced in response to the input data (408). For example, the accessed CTC acoustic model can provide one or more output values in response to the input data. In some implementations, the accessed CTC acoustic model can provide output values that respectively indicate likelihoods of occurrence of different phonetic units. Different output values can indicate the likelihood of occurrence of different context-dependent states, e.g., context-dependent states from the state inventory determined using the other CTC acoustic model used during training. The accessed CTC model may produce one or more outputs for each of multiple frames of the audio data. The accessed CTC model may output, for each frame, an output value indicating a likelihood of a "blank" label.

The output values produced by the accessed CTC model can be used by the speech recognition system to determine likely sequences of states or phonetic units that may represent the utterance. This information may be provided to a language model, which determines scores for various candidate words and word sequences. The scores of the language model can indicate how well word sequences match the sounds or states detected by the accessed CTC acoustic model as well as how well the word sequences follow common or acceptable language patterns. From the scores of the language model for various candidate language sequences, or for a word lattice, the speech recognition selects a highest-scoring candidate as the transcription.

The data indicating the transcription is provided as output of the automated speech recognition system.

In some implementations, the audio data is received from a client device over a computer network, and the data indicating the transcription is provided to the client device over the computer network.

In some implementations, providing the data indicating the transcription involves live streaming speech recognition results such that the data indicating the transcription is provided while audio data for an additional portion of the utterance is concurrently received.

Figure 5:
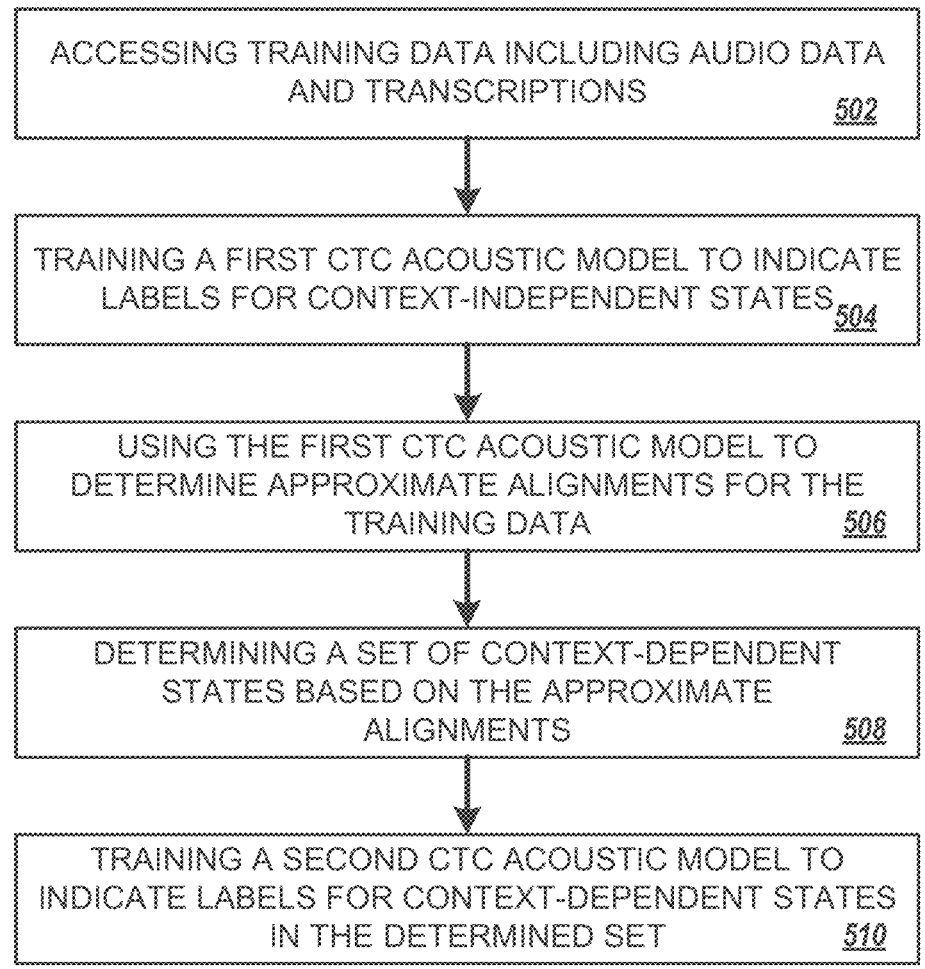
FIG. 5 is a flow diagram that illustrates an example of a process for training an acoustic model.

FIG. 5 is a flow diagram that illustrates an example of a process 500 for training an acoustic model. The process 500 can be performed by one or more computers of a speech recognition system, which may be a server system or other computing system.

Training data is accessed, where the training data includes (i) audio data corresponding to utterances and (ii) transcriptions for the utterances (502).

A first connectionist temporal classification (CTC) acoustic model is trained to indicate labels for context-independent states (504). Training the first CTC acoustic model comprises training the first CTC acoustic model to recognize multiple different pronunciations of a word using a pronunciation model that indicates multiple different phonetic sequences as valid pronunciations of the word. Training the first CTC acoustic model to recognize multiple different verbalizations of a written word using a verbalization model that indicates multiple different spoken words as valid verbalizations of the written word.

The first CTC acoustic model is used to determine approximate alignments between the audio data in the training data and phonetic sequences corresponding to the transcriptions in the training data (506). This can include, for individual input sequences, determining an approximate alignment of the input sequence with a graph representing all possible alternative target label sequences.

A set of context-dependent states based on the approximate alignments determined using the first CTC acoustic model (508).

A second CTC acoustic model is trained to indicate labels for the context-dependent states in the determined set of context-dependent states (510). The context-dependent states may be triphones or other context-dependent states.

The second CTC acoustic model can then be used to perform automated speech recognition, for example, as discussed with respect to FIG. 4. When additional training data is available, or a pronunciation or verbalization model is updated, some or all of the steps of the process 500 can be used to efficiently and accurately update or re-generate the second CTC acoustic model.

In some implementations, the first CTC acoustic model is a bidirectional CTC acoustic model and the second CTC acoustic model is a unidirectional CTC acoustic model. The first CTC acoustic model may include a recurrent neural network comprising one or more long short-term memory layers, and the second CTC acoustic model may also include a recurrent neural network comprising one or more long short-term memory layers.

In some implementations, training the first CTC acoustic model and training the second CTC acoustic model are performed independent of any other acoustic models.

Figure 6:
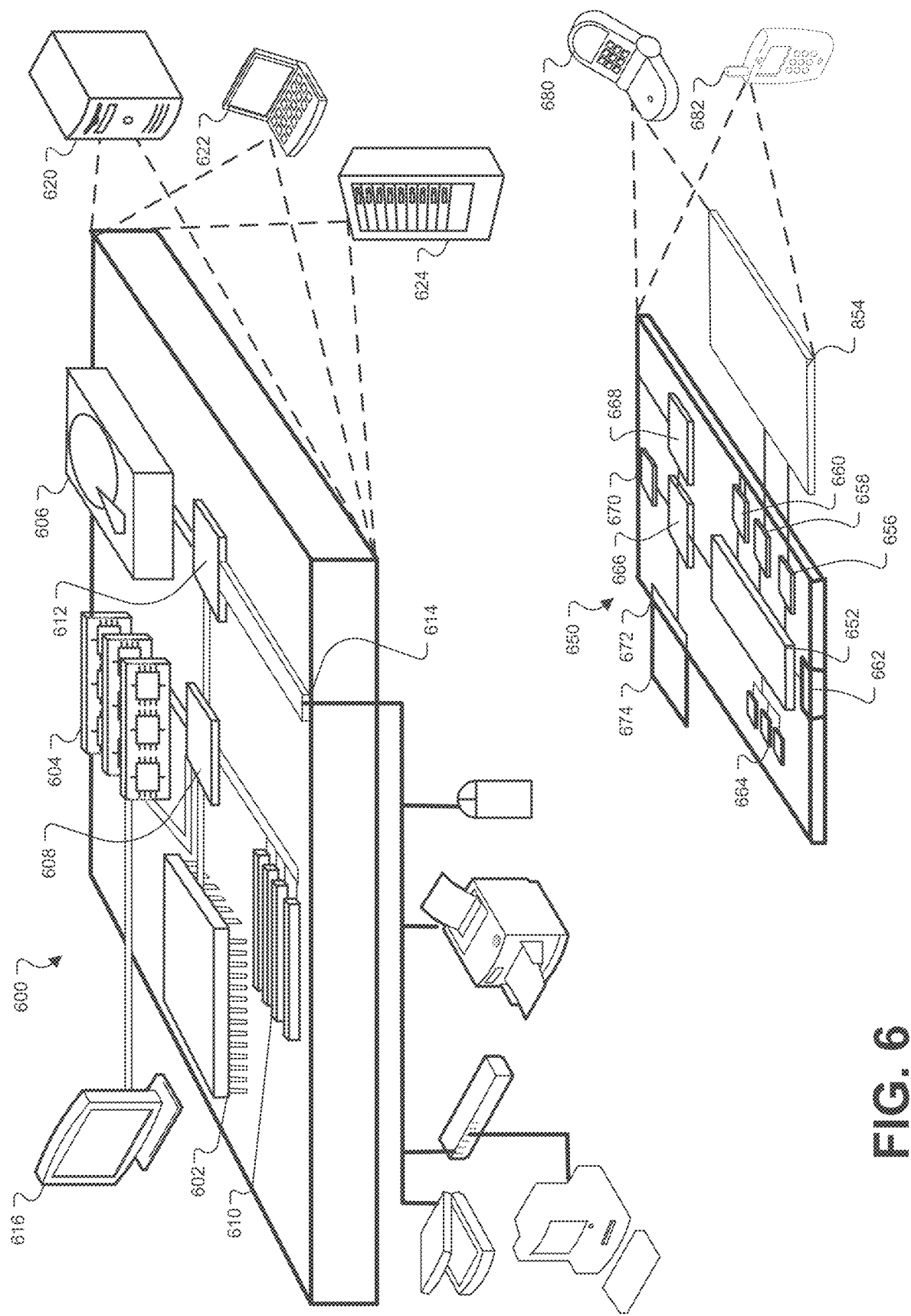
FIG. 6 is a block diagram that indicates examples of computing devices that can be used to carry out the techniques discussed herein.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. Additionally computing device 600 or 650 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question. e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks, magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device. e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component. e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication. e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments of the invention have been described. Other embodiments are within the scope of the following claims. For example, the actions recited in the claims may be performed in a different order and still achieve desirable results.

What is claimed is:

1. A method comprising:
receiving, at data processing hardware of a speech recognition system, audio data for a portion of an utterance spoken by a user;
dividing, by the data processing hardware, the audio data for the portion of the utterance into a sequence of fixed-length frames;
for each frame in the sequence of fixed-length frames, determining, by the data processing hardware, a corresponding set of log-Mel frequency cepstral coefficients;
generating, by the data processing hardware, using an acoustic model configured to receive the corresponding set of log-Mel frequency cepstral coefficients generated for each frame in the sequence of fixed-length frames as input, a sequence of context-dependent states representing the portion of the utterance; and
generating, by the data processing hardware, using a language model trained separately from the acoustic model, a streaming speech recognition result for the portion of the utterance spoken by the user,
wherein an acoustic model training process trains the acoustic model by:
obtaining acoustic model training data that comprises training audio data and word-level transcriptions for the training audio data;
training a first neural network model on the acoustic model training data to generate phonetic sequences corresponding to the word-level transcriptions;
generating, using the trained neural network model, a context-dependent state inventory from phonetic alignments between the training audio data and the phonetic sequences corresponding to word-level transcriptions; and
training, using the context-dependent state inventory, a second neural network model to generate outputs corresponding to one or more context-dependent states, the second neural network model having a plurality of long short-term memory layers;
wherein the trained second neural network model comprises the acoustic model.

2. The method of claim 1, wherein the acoustic model training process further trains the acoustic model by synthetically distorting, using a room simulator, the training audio data with noise obtained from various noise sources.

3. The method of claim 1, wherein the context-dependent states comprise labels for triphones or scores for labels for triphones.

4. The method of claim 1, wherein the acoustic model training process uses maximum mutual information (MMI) to train the second neural model to generate the outputs corresponding to the one or more context-dependent states.

5. The method of claim 1, wherein the acoustic model training process uses alignment data indicating alignments between the training audio data and the word-level transcriptions for the training audio data when training the second neural network model.

6. The method of claim 1, wherein generating the sequence of context-dependent states representing the portion of the utterance comprises generating output values indicating likelihoods corresponding to different context-dependent states.

7. The method of claim 1, further comprising, while generating the streaming speech recognition result for the portion of the utterance, concurrently receiving, at the data processing hardware, audio data for an additional portion of the utterance spoken by the user.

8. The method of claim 1, wherein the audio data is recorded by a user device associated with the user.

9. The method of claim 1, wherein training the first neural network model comprises training the first neural network model to recognize multiple different pronunciations for a word in the word-level transcriptions using a pronunciation model that indicates multiple different phonetic sequences as valid pronunciations of the word.

10. A system comprising: data processing hardware; memory hardware in communication with the data processing hardware and storing instructions that when executed by the data processing hardware cause the data processing hardware to perform operations comprising: receiving audio data for a portion of an utterance spoken by a user; dividing the audio data for the portion of the utterance into a sequence of fixed-length frames; for each frame in the sequence of fixed-length frames, determining a corresponding set of log-Mel frequency cepstral coefficients; generating, using an acoustic model configured to receive the corresponding set of log-Mel frequency cepstral coefficients generated for each frame in the sequence of fixed-length frames as input, a sequence of context-dependent states representing the portion of the utterance, and generating, using a language model trained separately from the acoustic model, a streaming speech recognition result for the portion of the utterance spoken by the user, wherein an acoustic model training process trains the acoustic model by: obtaining acoustic model training data that comprises training audio data and word-level transcriptions for the training audio data; training a first neural network model on the acoustic model training data to generate phonetic sequences corresponding to the word-level transcriptions; generating, using the trained neural network model, a context-dependent state inventory from phonetic alignments between the training audio data and the phonetic sequences corresponding to word-level transcriptions; and training, using the context-dependent state inventory, a second neural network model to generate outputs corresponding to one or more context-dependent states, the second neural network model having a plurality of long short-term memory layers, wherein the trained second neural network model comprises the acoustic model.

11. The system of claim 10, wherein the acoustic model training process further trains the acoustic model by synthetically distorting, using a room simulator, the training audio data with noise obtained from various noise sources.

12. The method of claim 10, wherein the context-dependent states comprise labels for triphones or scores for labels for triphones.

13. The method of claim 10, wherein the acoustic model training process uses maximum mutual information (MMI) to train the second neural model to generate the outputs corresponding to the one or more context-dependent states.

14. The method of claim 10, wherein the acoustic model training process uses alignment data indicating alignments between the training audio data and the word-level transcriptions for the training audio data when training the second neural network model.

15. The system of claim 10, wherein generating the sequence of context-dependent states representing the portion of the utterance comprises generating output values indicating likelihoods corresponding to different context-dependent states.

16. The system of claim 10, wherein the operations further comprise, while generating the streaming speech recognition result for the portion of the utterance, concurrently receiving audio data for an additional portion of the utterance spoken by the user.

17. The system of claim 10, wherein the audio data is recorded by a user device associated with the user.

18. The system of claim 10, wherein training the first neural network model comprises training the first neural network model to recognize multiple different pronunciations for a word in the word-level transcriptions using a pronunciation model that indicates multiple different phonetic sequences as valid pronunciations of the word.

* * * * *